United States Patent [19]

United States Patent [19]

Takashi

[11] Patent Number: 4,580,060
[45] Date of Patent: Apr. 1, 1986

[54] METHOD FOR SCANNING AN ORIGINAL PICTURE PHOTOELECTRICALLY TO OBTAIN PICTURE SIGNALS SIMULTANEOUSLY

[75] Inventor: Sakamoto Takashi, Kyoto, Japan

[73] Assignee: Dainippon Screen Seizo Kabushiki Kaisha, Kyoto, Japan

[21] Appl. No.: 464,907

[22] Filed: Feb. 8, 1983

[30] Foreign Application Priority Data

Feb. 9, 1982 [JP] Japan ................................. 57-18184

[51] Int. Cl.$^4$ ........................................... H01J 40/14
[52] U.S. Cl. ..................................... 250/578; 250/226; 356/407; 358/75; 358/293
[58] Field of Search ............... 358/75, 293, 294, 285; 356/402, 406, 407, 411, 419; 250/578, 226

[56] References Cited

U.S. PATENT DOCUMENTS

| | | | |
|---|---|---|---|
| 3,359,851 | 4/1964 | Lipschutz | 356/407 |
| 3,983,319 | 9/1976 | Moe et al. | 178/6.7 |
| 4,404,571 | 9/1983 | Kitamura | 346/108 |
| 4,413,276 | 11/1983 | Hertz et al. | 358/75 |
| 4,456,924 | 6/1984 | Rosenfeld | 358/75 |
| 4,465,939 | 8/1984 | Tamura | 250/578 |
| 4,467,195 | 8/1984 | Kawamura et al. | 250/578 |

Primary Examiner—John K. Corbin
Assistant Examiner—R. Eyssallenne
Attorney, Agent, or Firm—Lackenbach Siegel Marzullo Presta & Aronson

[57] ABSTRACT

A method for scanning an original picture photoelectrically in a picture scanning and reproducing machine, comprising the step of simultaneously projecting images of each of the scanned picture elements of the original picture on a plurality of adjacent scanning lines on each of a plurality of photosensor arrays for producing respective color separation picture signals. Through a pickup lens the scanning light beam is spread to cover the picture images on a plurality of the scanning lines.

3 Claims, 4 Drawing Figures

SCANNING DIRECTION

METHOD FOR SCANNING AN ORIGINAL PICTURE PHOTOELECTRICALLY TO OBTAIN PICTURE SIGNALS SIMULTANEOUSLY

BACKGROUND OF THE INVENTION

1. Field of Invention

The present invention relates to a method for scanning an original picture photoelectrically to obtain picture signals in a picture scanning reproducing machine, such as a colorless scanner, a color scanner, a facsimile etc. and particularly to a method for scanning a plurality of scanning lines simultaneously per one rotation of an original picture cylinder to pickup the corresponding number of picture signals to those of the scanning lines, whereby recording a reproduced picture is carried out in the picture scanning reproducing machine.

2. Description of the Related Art

In a previously proposed picture scanning reproducing machine of a cylinder type, for example, such as a color scanner and a color facsimile, picture signals corresponding to only one color scanning line are obtained per rotation of the original picture cylinder. Accordingly, in order to increase the rate of pickup of the picture signals, the original picture cylinder is necessarily rotated at a high speed, and thus a digital processor circuit having a high speed processing ability for performing color controls such as color correction, gradation control, and so forth, is required.

Another problem encountered when the original picture cylinder is rotated at a higher speed than that presently employed in order to save the scanning time for the original picture, is that the picture scanning signals can not be accurately read, for example, due to insufficient energy of the scanning light beam for each picture element.

Notwithstanding these problems, a so called layout scanner has been developed which can reproduce on film a plurality of reproduction pictures having desired reproduction scales and layout positions from a plurality of original pictures. As a result of increased use of such layout scanners, higher pickup speed of the picture scanning signals from the original picture is becoming strongly required.

SUMMARY OF THE INVENTION

The present invention provides a method for scanning a plurality of scanning lines at the same time per each cycle of rotation of an original picture cylinder, so as to simultaneously pickup the picture signals corresponding to those scanning lines, whereby recording a reproduction picture can be carried out in a picture scanning and reproducing machine such as a color scanner and a color facsimile, free from the afore-mentioned disadvantages and inconveniences. The pickup speed of the picture signals is thereby increased without increasing the rotation speed of the original picture cylinder or the response speed of the digital processor circuit. More particularly, the invention provides a novel method for scanning an original picture in which, without using any photomultiplier, a photosensor array comprising solid state elements such as diodes or CCDs (charged-coupled devices) which are smaller and lighter than the conventional photomultplier is used as a light receiving element for picking up picture signals corresponding to a plurality of scanning lines.

According to the present invention there is provided a method for scanning an original picture photoelectrically to obtain picture signals from a plurality of scanning lines simultaneously, whereby recording a reproduction picture in a picture scanning and reproducing machine is increased. The improved method comprises the step of projecting images of each of the scanned picture elements of the original picture on a plurality of adjacent scanning lines on each of a plurality of photosensor arrays which thereby produced respective color separation picture signals. Through a pickup lens the scanning light beam is spread to cover said images and said scanning lines, whereby a plurality of picture images corresponding to said plurality of scanning lines can be simultaneously obtained.

BRIEF DESCRIPTION OF THE DRAWINGS

In order that the present invention may be better understood, preferred embodiments thereof will be described with reference to the accompanying drawing, in which.

DESCRIPTION OF THE PREFERRED EMBODIMENTS

Figure 1:
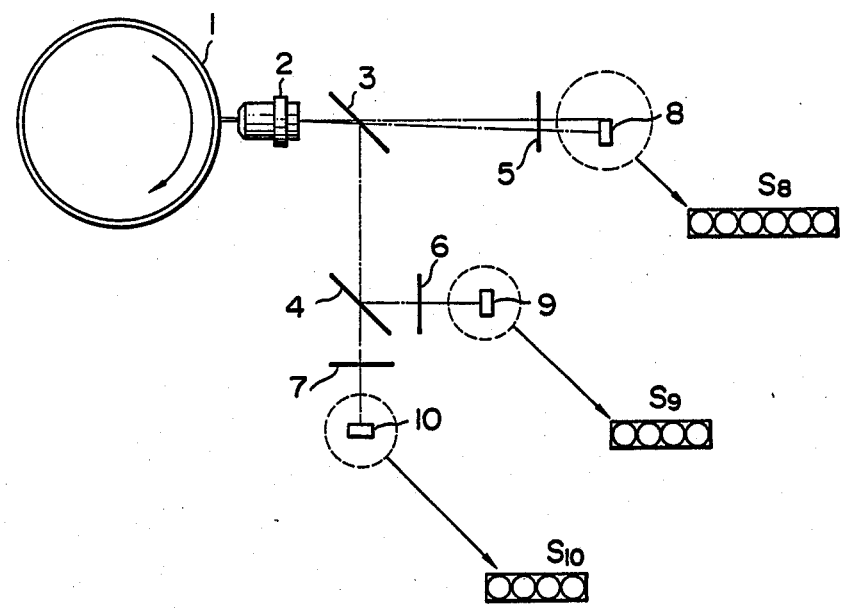
FIG. 1 is a schematic side view of a scanning head for explaining one of the embodiments of a method according to the present invention.

FIG. 1 is a schematic view of an embodiment of the present invention for explaining a principle of the method according to the present invention. An original picture mounted to an original picture cylinder 1 is scanned photoelectrically by a light beam producing a plurality of adjacent scanning lines per rotation cycle, for example, six scanning lines, and images of six micro picture elements of the scanned original picture on each of the six scanning lines are projected on a photosensor array 8 through a pickup lens 2, a dichroic mirror 3 and a green (G) color separation filter 5, whereby G color separation picture signals corresponding to each of the six scanning lines are simultaneously detected.

At the same time, the images of the micro picture elements on the respective scanning lines comprised in the light beam reflected by the dichroic mirror 3 are also projected on photosensor arrays 9 and 10 through a dichroic mirror 4, a red color (R) separation filter 6 and a blue color (B) separation filter 7 respectively. Accordingly, R, B and G color separation signals corresponding to respective scanning lines are detected simultaneously.

As shown by the line having an arrow head in FIG. 1, the photosensors in the photosensor array 8 are larger in number than in each of photosensor arrays 9 and 10, and further the photosensors in the photosensor array 8 are disposed so that they may produce picture signals corresponding to picture elements which are advanced in the main scanning direction as compared with those which are scanned by the photosensors included in the photosensor arrays 9 and 10.

Figure 2:
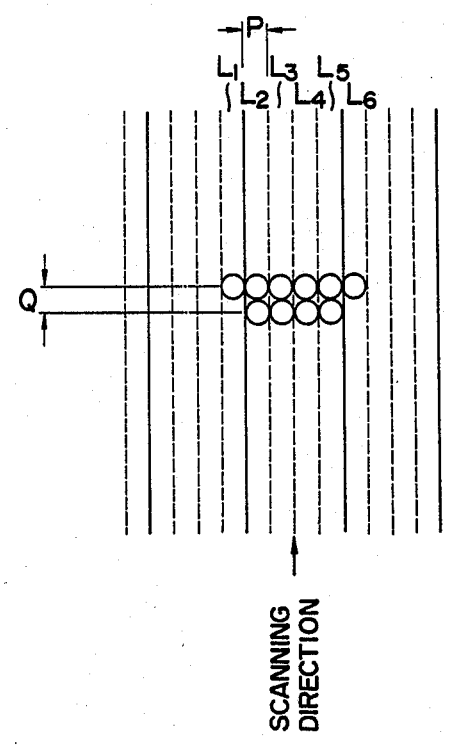
FIG. 2 is a view showing positional relationships among each of scanning picture elements to be scanned which is read by each of photosensor arrays shown in FIG. 1.

In FIG. 2 there is shown one of the examples of positional relationships among each of the picture elements of the original picture projected on the photosensor arrays 8,9 and 10, in the case of reading picture signals corresponding to four scanning lines simultaneously. In the figure the photosensor arrays are disposed so that the picture elements projected on each of the photosensor arrays 9 and 10 are delayed in the main scanning direction by one picture element as compared with the picture elements projected on the photosensor array 8.

In addition, in FIG. 2, P shows the pitch of the scanning lines and Q shows the spacing between picture elements projected on the photosensor array 8 and those projected on the photosensor arrays 9 and 10. The reason why the number of the photosensors in at least in one of the photosensor arrays 8, 9 and 10 exceeds those of the other photosensor arrays to obtain each of the color separation signals, and why the disposition thereof is advanced in the main scanning direction of the original picture, is to make it possible to emphasize, as disclosed in the specification of Japanese Patent Application No. 54-82571 ( Japanese Patent Laid-Open Publication No. 56-8140) of the Applicant, details of the original picture by digitally processing the picture image signals. If there is no necessity for emphasizing details in the original picture, or for deriving any signals for emphasizing details, it is unnecessary to dispose the photosensor arrays as mentioned the above.

Each of the color separation picture signals detected by respective photosensor arrays 8, 9 and 10 is stored in the same sequence as the picture elements in a plurality of buffer memories, for example, at least three buffer memories in the case of the embodiment shown in FIG. 2, connected with each of the photosensors which compose the respective photosensor arrays 8, 9 and 10.

Signals corresponding to the scanned picture elements of the original picture are produced by each of the photosensor arrays 8, 9 and 10, and are stored in respective buffer memories connected to each of the photosensors which compose each of the photosensor arrays 8, 9 and 10. The scanned picture elements are shown by a rectangular frame 11 surrounded by thick solid lines in FIG. 3.

Hereinafter, for convenience's sake the embodiment shown in FIG. 3 will be explained by using rectangular coordinates in which the main scanning direction of the original picture is set as Y axis direction, the subsidiary scanning direction thereof is set as that of X axis, and each of the picture elements is designated by a coordinate value [X, Y].

Figure 3:
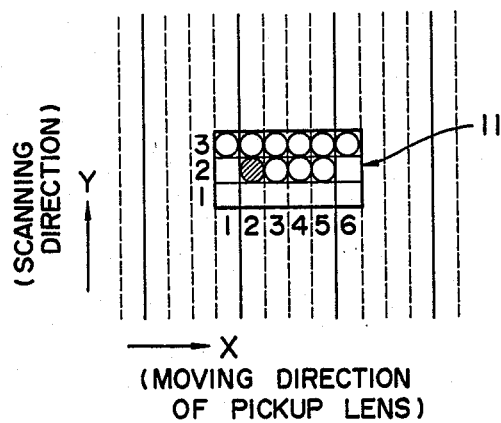
FIG. 3 is a view showing one of the examples of the scanning operation being performed.

At the scanning instant shown in FIG. 3, the R color separation picture signal and the B color separation picture signal of the respective picture elements designated by coordinate values [2, 2], [3, 2 ], [4, 2 ] and [5, 2 ] are being read by the photosensor arrays 9 and 10, respectively, the G color separation signals corresponding to each of those picture elements having previously been read by the photosensor array 8. The G color separation picture signals corresponding to each of said picture elements, which have been previously written in the buffer memory, are then read out of the buffer memory. Thus, the G color separation signal is supplied to the color digital processor circuit connected to the buffer memory together with each of said R and G color separation picture signals. Thus, well-known normal functions of a color scanner such as color correction, gradation correction etc. can be carried out in the color digital processor circuit.

As described above, according to the present invention, each of color separation picture signals corresponding to four scanning lines can be obtained simultaneously, so that in the case of this embodiment scanning time of the original picture can be reduced to ¼ that of in the conventional method.

In addition, corresponding to each of the scanning lines, one color digital processor circuit may be provided as descibed in the specification of the above-identified Japanese Patent Application No. 54-82571, and it is also possible to carry out color separation of the picture signals corresponding to each of the scanning lines by disposing a switching means at both pre-stage and post-stage of the color digital processor circuits respectively which functions the same as that of the four scanning lines.

Further, as disclosed in the specification of Japanese Patent Application No. 54-82571, it is possible to emphasize details of the original picture by digital processing of the picture signals to perform a subtraction operation.

For example, when a detail emphasizing signal corresponding shading desired, an original signal for emphasizing detail thereof can be generated by subtracting a value the eight times of G color separation picture signal value of the emphasized picture element [2, 2 ] from the sum of the G color separation picture signal values of the eight picture elements [1, 1 ], [1, 2 ], [1, 3 ], [2, 3 ], [3, 3 ], [3, 2 ], [3, 1 ] and [2, 1 ] adjoining the emphasized picture element [2, 2 ]. Original signals for emphasizing details corresponding to picture elements [3, 2 ], [4, 2 ] and [5, 2 ] also can be generated in the same manner as the above described case.

In the above described embodiment in order to generate the detail emphasizing signal it is necessary to dispose each of the photosensor arrays so that the picture elements scanned by the photosensor array 8 are advanced in the main scanning direction of the original picture as compared with the picture elements simultaneously scanned by photosensor arrays 9 and 10, and to connect a buffer memory to each of the plurality of photosensors which comprise the respective photosensor arrays.

Figure 4:
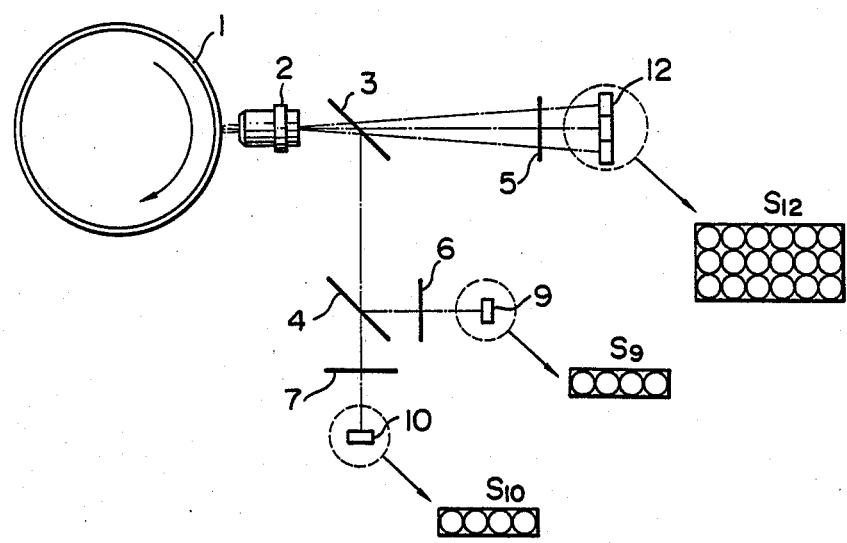
FIG. 4 is a schematic view for illustrating other embodiments of the method according to the present invention.

In the embodiment shown in FIG. 4 a buffer memory, is not used. A photosensor array 12 for the G color separation picture signal is constructed, as shown by the line having an arrow head in the figure, by using the number of photosensors necessary for the detail emphasizing signals. According to the abovedescribed construction, the photosensors produce color separation signals corresponding to the four scanning lines and simultaneously generate the detail emphasizing signal.

The afore-described embodiment was, for simplicity's sake, an example of the case in which picture signals corresponding to eight picture elements in the vicinity of a marked picture element are used for generating the detail emphasizing signal. However, it is also possible to use picture signals corresponding to 24 or more scanning picture elements in the vicinity of a marked scanning picture element to generate the detail emphasizing signal. In practice, the latter case may be more preferable.

As above-described, according to the present invention it is possible to simultaneously read picture signals corresponding to a plurality of scanning lines, so that as compared with the conventional scanning method the time necessary for scanning the original picture can be remarkably reduced. In addition, by employing a photosensor array comprising solid state elements in place of a photomultiplier as a light receiving element the scanning head can be made compact and lighter. Thus, the present invention is very practical and effective.

In the above described embodiment, a photosensor array is provided per scanning picture element, but, for example, a plurality of photosensor arrays, for example, 2 to 4 of them may be provided per scanning picture element. It is also possible to provide a plurality of photosensor arrays not only for the G color separation picture signal but also for the R color separation picture signal, and further it is also possible to provide a plurality of photosensor arrays for both the G and R color separation picture signals so that detail emphasizing signals provided thereby may be changed freely.

What is claimed is:

1. In a method for sequentially scanning areas of an original picture photoelectrically in sequential scanning cycles to obtain picture signals corresponding to picture elements in each of such areas lying on each of successive straight scanning lines which extend parallel to each other in a principal scanning direction, the width of each scanning lines being orthogonal to the principle scanning direction, said improvement comprising:

illuminating the original picture with a light beam which is spread orthogonally to the principal scanning direction to cover a plurality of said successive scanning lines during such scanning cycle;

and simultaneously projecting images of the picture elements on each of said plurality of successive scanning lines on respective photosensor arrays, each of said photosensor arrays producing color separation picture signals corresponding to the images of the picture elements projected thereon;

the images of the scanned picture elements projected on one of said photosensor arrays during each scanning cycle advanced in the principal scanning direction by at least one picture element as compared with the images of the scanned picture elements simultaneously projected on the remaining photosensor arrays during the same scanning cycle whereby color separation picture signals corresponding to the picture elements on each of said plurality of successive scanning lines of each of said picture areas are simultaneously obtained during each scanning cycle.

2. A method in accordance with claim 1, wherein the images of the scanned picture elements projected on one of said photosensor arrays during each scanning cycle are of picture elements some of which precede and some of which follow the picture elements of which images are simultaneously projected on the remaining photosensor arrays.

3. A method in accordance with claim 1, wherein the color separation signals produced by the photosensors in said one photosensor array during each scanning cycle are stored in a buffer memory and subsequently combined with the color separation signals produced by the photosensors in the remaining photosensor arrays during the same scanning cycle.

* * * * *